US007223962B2

(12) United States Patent
Fageraas et al.

(10) Patent No.: US 7,223,962 B2
(45) Date of Patent: May 29, 2007

(54) DIGITAL OPTICAL SIGNAL TRANSMISSION IN A SEISMIC SENSOR ARRAY

(75) Inventors: Bjarte Fageraas, Missouri City, TX (US); Lawrence P. Behn, Houston, TX (US)

(73) Assignee: Input/Output, Inc., Houston, TX (US)

( * ) Notice: Subject to any disclaimer, the term of this patent is extended or adjusted under 35 U.S.C. 154(b) by 226 days.

(21) Appl. No.: 10/784,665

(22) Filed: Feb. 23, 2004

(65) Prior Publication Data
US 2005/0184260 A1    Aug. 25, 2005

(51) Int. Cl.
*G01J 1/04*    (2006.01)
*G02B 6/00*    (2006.01)
*G01V 1/00*    (2006.01)

(52) U.S. Cl. ............... 250/227.14; 385/12; 702/14
(58) Field of Classification Search ........ 250/573, 250/227.14–227.18, 227.24; 356/32; 385/1, 385/4, 10, 12–14, 31, 32, 40, 853.7; 398/118; 702/14
See application file for complete search history.

(56) References Cited

U.S. PATENT DOCUMENTS

| 4,313,192 | A | * | 1/1982 | Nelson et al. ............... 398/102 |
| 5,627,798 | A | * | 5/1997 | Siems et al. .................. 367/76 |
| 5,675,674 | A | * | 10/1997 | Weis ..................... 250/227.18 |
| 6,256,588 | B1 | * | 7/2001 | Maida et al. ................. 702/14 |
| 6,271,766 | B1 | * | 8/2001 | Didden et al. ................. 398/9 |
| 6,522,797 | B1 | * | 2/2003 | Siems et al. ........... 250/227.14 |

* cited by examiner

*Primary Examiner*—Stephone B. Allen
(74) *Attorney, Agent, or Firm*—Madan, Mossman & Sriram, P.C.

(57) ABSTRACT

The invention describes a sensor array with digital signals transmitted over an optical fiber for seismic exploration systems. The seismic system includes a transducer for providing digital optical data signals and an optical interrogator for collecting the digital data. The transducer provides data from seismic sensors to the optical interrogator by acting on an optical carrier transmitted along the optical fiber. The system is designed to utilize known electromechanical seismic sensors with fiber optic telemetry.

42 Claims, 3 Drawing Sheets

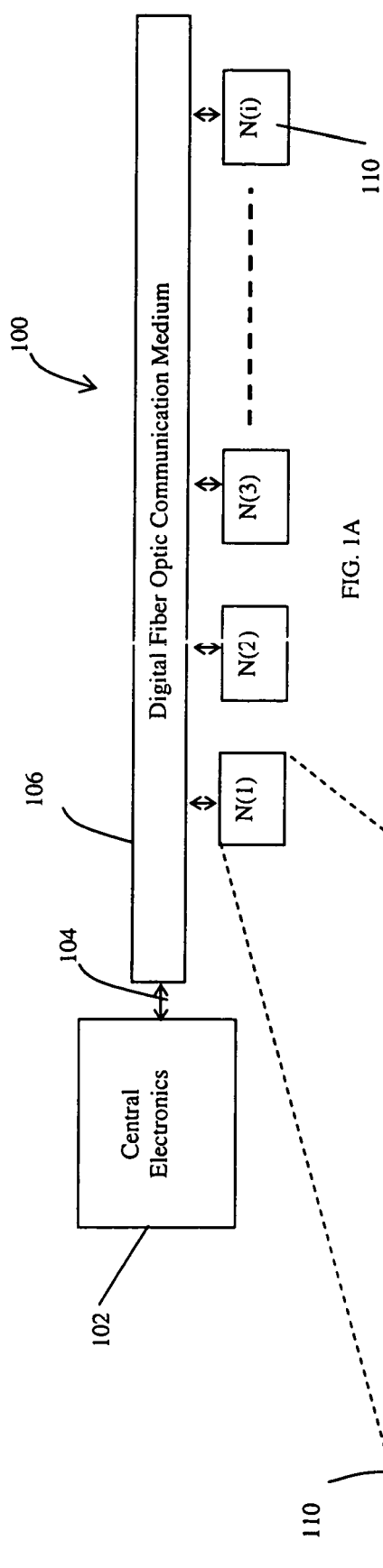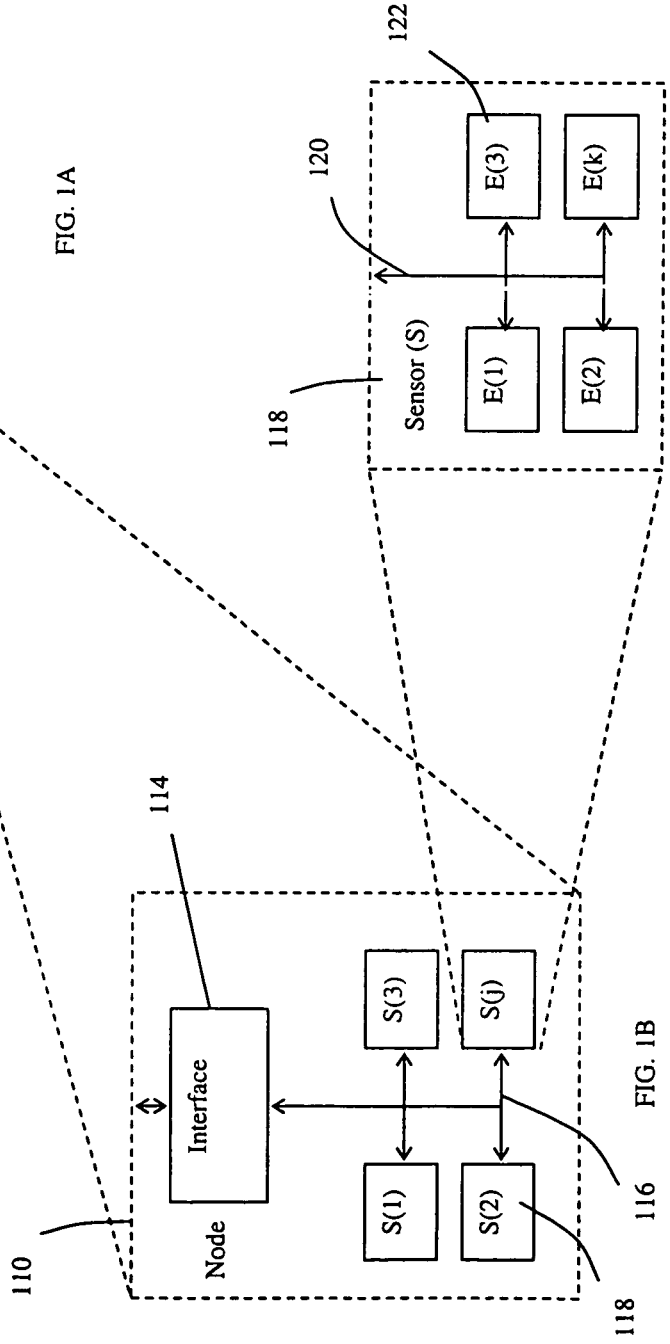

DIGITAL OPTICAL SIGNAL TRANSMISSION IN A SEISMIC SENSOR ARRAY

FIELD OF THE INVENTION

This invention relates to a sensor array as used in seismic exploration systems and more particularly to a sensor array with digital signals transmitted over an optical transmission fiber where the array might include passive components.

DESCRIPTION OF THE RELATED ART

Marine seismic surveys are typically conducted by towing a sensor array and a source array behind a vessel. Traditional marine sensor arrays include a mechanical cable with pressure sensors (hydrophones) distributed along the length of the cable. The hydrophones sense energy waves that originate at the source array and reflect off of subsurface strata. The hydrophones convert the pressure into a voltage signal, which is typically filtered and digitized by electronics in the cable and subsequently delivered along the cable to a central recording system.

The typical sensor array has a number of disadvantages. Most arrays typically are referred to as active arrays—requiring power to be transmitted down a cable for digitization and filtering circuits. Active arrays have long been known as being susceptible to failures through water ingress as well as crosstalk. Some arrays use fiber optic telemetry to minimize crosstalk problems, but these arrays still rely on power conductors to provide power from a central source to electronics distributed throughout the array. The distributed electronics generally require power for converting electrical signals to analog optical signals and for signal conditioning. As such, these systems still experience failures due to water ingress. A few systems use fiber optic sensors and telemetry; these systems may be entirely passive—that is, they rely on no external power source. However, none of these "all fiber" systems are proven to be suitable for commercial use, largely due to difficulties with fiber optic sensor design.

Optic telemetry systems such as those described above transmit analog signals along the fiber using interferometrics. However, these analog optical signal transmission methods do not provide a desired amount of bandwidth for some seismic applications. In addition, some analog systems use wave division multiplexing techniques. These require an expensive and complex central recording system to demultiplex the analog optical signal in order to acquire the desired seismic data.

SUMMARY OF THE INVENTION

The present invention addresses one or more of the problems associated with the several seismic sensor systems described above by providing a seismic system including a digital optical communication apparatus that comprises a passive sensor and transducer for low-power digital optical signal transmission.

A seismic system embodying features of the invention includes a plurality of transducers for providing digital optical data signals by acting on an optical carrier and an optical interrogator for retrieving the digital optical data signals.

In a preferred embodiment, the seismic system includes an optical source for providing the optical carrier to the plurality of transducers. In another preferred embodiment, the plurality of transducers receives a digital electrical signal input. In another preferred embodiment, the plurality of transducers modulates the optical carrier. In another preferred embodiment, the digital optical data signals include symbol data including one or more properties of the modulated optical carrier. In another preferred embodiment, the property of the modulated optical carrier is selected from the group consisting of amplitude and polarization. In another preferred embodiment the plurality of transducers reflects the optical carrier using a mirror. In another preferred embodiment, the mirror is a micro-machined mirror. In another preferred embodiment, the plurality of transducers changes one or more properties of the modulated optical carrier. In another preferred embodiment, the plurality of transducers is selected from the group consisting of a Bragg grating and a liquid crystal device. In another preferred embodiment, the transducers receive a signal from one or more sensors. In another preferred embodiment, the seismic system includes a power source charging circuit that receives optical power from the telemetry cable and converts that power into electrical power. In another preferred embodiment, the sensors operate in a low power state. In another preferred embodiment, each sensor is a type of transducer selected from the group consisting of an accelerometer, a velocity sensor, a hydrophone, an electromagnetic sensor, a velocimeter, a temperature sensor, a heading sensor, a flow sensor, and an inertial sensor. In another preferred embodiment, the seismic system includes an interface circuit including an electrical-to-optical digital signal transducer.

Also in accordance with the invention there is provided a method of monitoring a subsurface formation with a seismic system. The method includes providing digital optical data signals using a plurality of transducers to act on an optical carrier, and retrieving the digital optical data signals using an optical interrogator.

In a preferred embodiment, the method provides the optical carrier to the plurality of transducers using an optical source. In another preferred embodiment, the plurality of transducers receives a digital electrical signal input. In another preferred embodiment, the plurality of transducers modulates the optical carrier. In another preferred embodiment, the digital optical data signals include symbol data including one or more properties of the modulated optical carrier. In another preferred embodiment, the property of the modulated optical carrier is selected from the group consisting of amplitude and polarization. In another preferred embodiment, the plurality of transducers reflects the optical carrier using a mirror. In another preferred embodiment, the mirror is a micro-machined mirror. In another preferred embodiment, the plurality of transducers changes one or more properties of the modulated optical carrier. In another preferred embodiment, the plurality of transducers is selected from the group consisting of a Bragg grating and a liquid crystal device. In another preferred embodiment, the transducers receive a signal from one or more sensors. In another preferred embodiment, the method provides a power source charging circuit that receives optical power from the telemetry cable and converts that power into electrical power. In another preferred embodiment, the sensors operate in a low power state. In another preferred embodiment, each sensor is a type of transducer selected from the group consisting of an accelerometer, a velocity sensor, a hydrophone, an electromagnetic sensor, a velocimeter, a temperature sensor, a heading sensor, a flow sensor, and an inertial sensor. In another preferred embodiment, the method provides an interface circuit including an electrical-to-optical digital signal transducer.

Also in accordance with the invention there is provided an apparatus for acquiring seismic information. The apparatus includes a sensor for sensing an environmental condition and providing a first signal indicative of the sensed environmental condition, a transducer coupled to the sensor for receiving the first signal, and, an optical fiber coupled to the transducer, the transducer converting the received first signal to a digital optical signal in the optical fiber.

In a preferred embodiment, the transducer modulates an optical carrier to convert the first signal to the digital optical signal. In another preferred embodiment, the transducer includes a controllable reflector operable to modulate an optical carrier to convert the first signal to the digital optical signal. In another preferred embodiment, the transducer includes a micromachined reflector operable to modulate an optical carrier to convert the first signal to the digital optical signal. In another preferred embodiment, the transducer includes an electromechanical actuator acting on the optic fiber to modulate an optical carrier in the fiber to convert the first signal to the digital optical signal. In another preferred embodiment, the transducer includes a controllable light source, the transducer activating and deactivating the controllable light source in response to the first signal to convert the first signal to the digital optical signal. In another preferred embodiment, the sensor further includes an analog-to-digital converter, the first signal being a digital electrical signal.

Also in accordance with the invention there is provided a system for acquiring seismic information. The system includes a sensor for sensing an environmental condition and providing a first signal indicative of the sensed environmental condition, a transducer coupled to the sensor for receiving the first signal, an optical fiber coupled to the transducer, the transducer converting the received first signal to a digital optical signal in the optical fiber, and a recorder recording information based at least in part on the digital optical signal, the recorded information being indicative of the sensed environmental condition.

In a preferred embodiment, the system includes a light source providing an optical carrier, the transducer operating on the optical carrier to convert the first signal to the digital optical signal.

Also in accordance with the invention there is provided a method of acquiring information relating to an environmental condition. The method includes sensing the environmental condition with a sensor, generating a first signal indicative of the sensed environmental condition, converting the first signal to a digital optical signal in an optic fiber, and transmitting the digital optical signal in the optic fiber.

In a preferred embodiment, the method includes converting the first signal to the digital optical signal comprises activating and deactivating a light source. In another preferred embodiment, the method includes converting the first signal to the digital optical signal comprises acting on an optical carrier to generate the digital optical signal.

BRIEF DESCRIPTION OF THE DRAWINGS

The novel features of this invention, as well as the invention itself, will be best understood from the attached drawings, taken along with the following description, in which similar reference characters refer to similar parts, and in which:

FIG. 1A is a schematic diagram of a seismic system including a central electronics and multiple nodes and employing digital optical communications;

FIG. 1B is a diagram of a seismic sensor node including seismic sensors and an interface device;

FIG. 1C is a diagram of a seismic sensor with sensor elements;

DESCRIPTION

Figure 2:
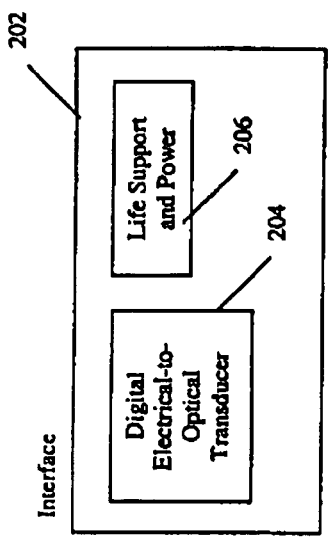
FIG. 2 is a diagram showing the transducer and life support and power components of the node in FIG. 1.

A seismic system 100 using direct, digital, seismic information delivery according to the present invention is shown in FIGS. 1A, 1B, & 1C. A central electronics system 102 is coupled to a fiber optic telemetry medium 106. The medium 106 is connected to one or more sensor nodes N(1)–N(i) 110, where (i) is an integer. Each node 110 includes one or more sensors S(1)–S(j) 118, where (j) is an integer. Each node 110 is coupled to the medium using an interface device 1 14. In one embodiment, each sensor 118 includes one or more sensor elements E(1)–E(k) 122, where (k) is an integer.

The sensor elements of the embodiments shown are connected to an electrical path 120 with one or more channels for transmitting seismic data signals and/or command and control signals. In one embodiment, multiple sensor elements are coupled in an array with a single output formed by analog or digital summing. Each sensor 118 provides a digital electrical signal, indicative of a sensed environmental condition such as seismic energy, through an electrical path 116 to the interface device 114. The environmental condition sensed may be any useful sensed characteristic, so the term environmental condition includes, but is not limited to pressure, velocity, temperature, acceleration, magnetic properties, heading, flow, or inertial properties. The path 116 may also include one or more channels for data transmission. The interface device according to the present invention is a device that modulates an optical carrier as a function of the signal from the sensor 118. The term, optical carrier, is used herein to mean energy in the form of light transmitted in a light-carrying medium such as an optic fiber. Modulating an optic carrier means to act on an optic carrier to effect a desired signal.

Figure 3C:
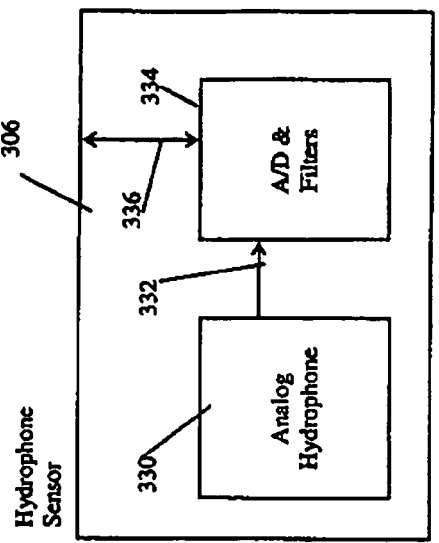
FIG. 3C is a diagram of a hydrophone sensor.
Figure 3B:
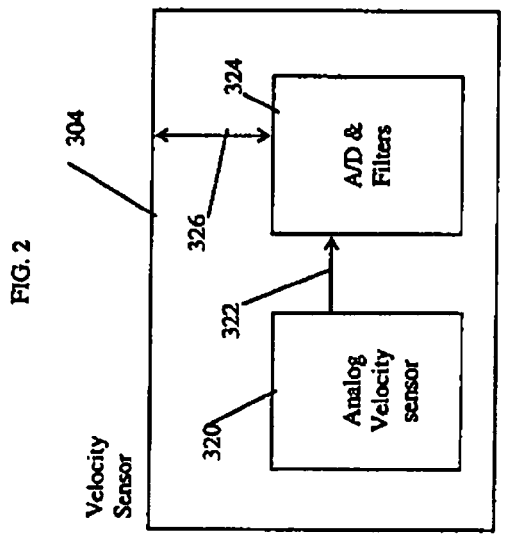
FIG. 3B is a diagram of a velocity sensor.
Figure 3A:
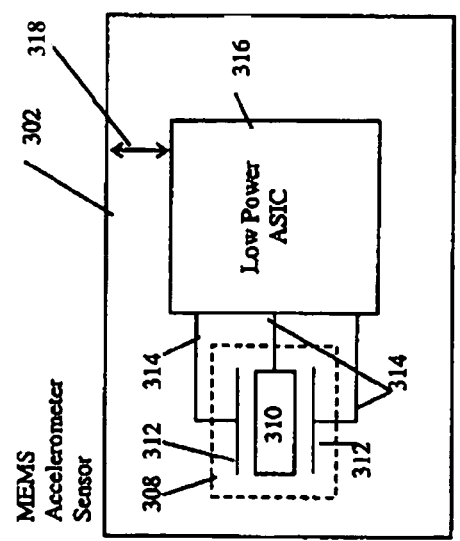
FIG. 3A is a diagram of a MEMS accelerometer sensor.

Several alternative embodiments of the present invention use sensor elements 122 are selected according to a desired measurement. As shown in FIGS. 3A, 3B, & 3C, each sensor element 122 may be a pressure sensor such as a hydrophone, a geophone, a velocity sensor, a temperature sensor, or a MEMS accelerometer sensor. The sensor element may also be an electromagnetic sensor, a velocimeter, a heading sensor, a flow sensor, or an inertial sensor. Furthermore, the present invention is useful for land-based sensor arrays and for downhole sensor arrays as well the as marine applications described herein. Thus, the description present invention and claims are intended to be inclusive of land, downhole and marine applications.

Referring to FIG. 2, an interface device 202 according to the present invention includes a digital electrical-to-optical transducer 204 and may optionally include a life support and power module 206. The transducer 204 may comprise a controllable reflector (such as a micro-machined mirror), an electromechanical actuator, a Bragg grating, a liquid crystal device, or any other known device for modulating an optical signal. Alternatively, the transducer 204 might include a controllable light source, such as a laser diode. The transducer, by modulating the carrier, outputs digital optical data signals for transmission along the fiber optic medium. The module 206, if used, manages power distribution to the sensors 118 described above and shown in FIGS. 1A, 1B & 1C.

The module 206 in one embodiment includes an on-board, high-density power source such as a battery or fuel cell.

In another embodiment the module 206 includes a power converter to receive power through the fiber optic medium 106. Alternatively the module 206 includes a power source charging circuit for receiving optical power from the medium 106, converting it to electrical power and charging an on-board source.

In operation the transducer 204 receives an electrical output signal from the sensor 118 and converts the sensor output signal to a digital optical signal in the fiber optic medium 106 for transmission to the central electronics 102. In one embodiment the sensor output signal is an analog signal, the signal being digitized in the transducer by an analog-to-digital converter. Alternatively, the sensor provides a digital electrical output signal. The transducer 204 is preferably a passive device, but may optionally receive power from the module 206.

Referring again to FIGS. 3A, 3B & 3C, the sensor 118 may include a MEMS accelerometer sensor 302, a velocity sensor 304, or a hydrophone sensor 306, all with on-board electronics to digitize and filter the output. The accelerometer 302 of FIG. 3A includes a capacitive sensor 308 with mass 310 and capacitive plates 312, electrically connected by leads 314. A low power ASIC 316 provides digital signal output 318. The velocity sensor 304 of FIG. 3B shows an analog velocity sensor 320, usually an electromagnetic sensor, coupled to analog-to-digital converter 324 by electrical connection 322 and providing digital output 326. The hydrophone sensor 306 of FIG. 3C includes an analog hydrophone coupled to analog-to-digital converter 334 by electrical connection 332 and providing digital output 336.

The seismic system is suited to a variety of geophysical sensing applications including geophysical exploration and long-term oil and gas reservoir monitoring. The system may be deployed in a number of configurations: conventional above-ground, within a well-bore, marine towed array, or as an ocean bottom system.

The sensor and node combination requires a small amount of power, most of which is required during operation. The system preferably has no electrical power transmission conductors between the central electronics and the node. Such a system may be referred to as a telemetry system with powered nodes. The node is preferably self-powered using a high-density energy source, which may be rechargeable. The node may optionally receive electrical power converted from light power transmitted by the fiber optic medium. While this power-supplying means is very slow, power may be delivered during operational and non-operational modes so as to maximize the amount of power delivery over time. The node may pull power from the source continuously or in a pulsed manner to conserve power.

Such a system provides an ideal platform for reservoir monitoring, especially in ocean bottom and well-bore environments. Traditional seismic systems in these environments tend to fail when used for a number of years. Failure modes often originate with electrical conductors used for telemetry. Traditionally, electrical conductors are prone to excessive noise, cross-talk, short-circuiting, and transmission loss when deployed in harsh subsea or well-bore environments. On the other hand, optical fibers experience relatively low transmission loss, cross-talk, and noise.

Another advantage with the system described is its ability to employ a variety of sensors including proven analog sensors. Typical passive fiber optic seismic systems typically interface to fiber optic sensors, which are relatively expensive compared to their electrical counterparts and are much less used for production seismic operations.

Referring back to FIGS. 1A, 1B & 1C, the fiber optic medium includes one or more optical fibers for transmitting digital optical data signals. While the typical analog fiber optic systems are limited in bandwidth to about 50 analog channels per fiber, a fiber carrying digital data may transmit many more channels per fiber. The digital signal preferably transmits a 24 bit word using various modulation techniques, such as wave division multiplexing (WDM) and time division multiplexing (TDM). A particular digital symbol may be sent by modulating properties of the optical carrier such as amplitude, phase, frequency, or polarization.

Figure 4:
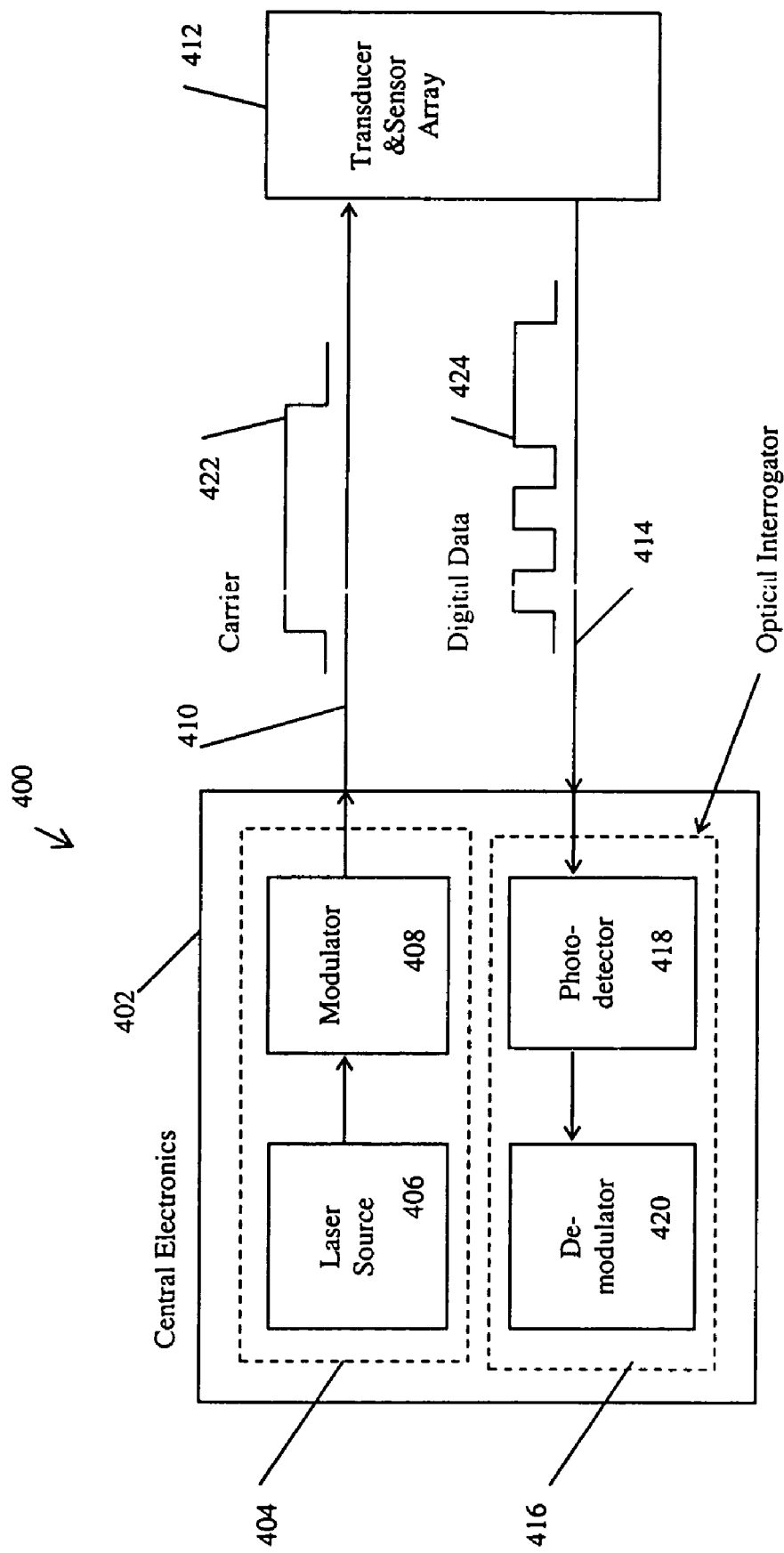
FIG. 4 is a diagram of the seismic system showing the components of the optical transmission system.

Referring to FIG. 4, the seismic system 400 with digital optical data signal transmission is shown. The central electronics 402 include an optical source 404 and optical interrogator 416. The optical source 404 includes a light source 406 such as a laser and a modulator 408. The optical source generates an optical carrier 422 which is transmitted along an optical fiber 410. The carrier is modulated by a transducer and sensor array 412 which sends digital data 424 along an optical fiber 414 to the interrogator 416. The interrogator includes a photodetector 418 and demodulator 420. In this fashion, bidirectional optical data transmission is achieved with a single source/receiver combination at one end of a transmission path, namely the central electronics, rather than employing separate source and receiver combinations at both ends of a transmission path.

The central electronics 402 also includes a recorder coupled to the optical interrogator 416 for recording information. At least a portion of the recorded information is seismic information which is received by the central electronics 402.

While the particular invention as herein shown and disclosed in detail is fully capable of obtaining the objects and providing the advantages hereinbefore stated, it is to be understood that this disclosure is merely illustrative of the presently described embodiments of the invention. It will be apparent, however, to one skilled in the art that many modifications and changes to the embodiments set forth above are possible without departing from the scope of the invention. It is intended that the following claims be interpreted to embrace all such modifications and changes.

What is claimed is:

1. An apparatus for transmitting a digital information a digital optical data signal in a seismic data acquisition system, the apparatus comprising:
   a) a transducer that modulates an optical carrier to produce the digital optical data signal corresponding to a signal indicative of a sensed environmental condition; and
   b) an optical interrogator in optical communication with the transducer for retrieving the digital optical data signals.

2. The apparatus of claim 1 further comprising an optical source for providing the optical carrier to the transducer.

3. The apparatus of claim 1, wherein the transducer receives a digital electrical signal input.

4. The apparatus of claim 1, wherein the transducer modulates a property of the optical carrier.

5. The apparatus of claim 4, wherein the digital optical data signal includes symbol data indicative of the modulated property of the modulated optical carrier.

6. The apparatus of claim 4, wherein the modulated property includes one or more of amplitude and polarization.

7. The apparatus of claim 1, wherein the transducer includes a mirror for reflecting at least a portion of the optical carrier.

8. The apparatus of claim 7, wherein the mirror comprises a micro-machined mirror.

9. The apparatus of claim 4, wherein the transducer further comprises a plurality of transducers.

10. The apparatus of claim 9, wherein the plurality of the transducers comprises one or more of a Bragg grating and a liquid crystal device.

11. The apparatus of claim 1, wherein the transducer receives the signal indicative of a sensed environmental condition from one or more sensors.

12. The apparatus of claim 1 further comprising a power source charging circuit that receives optical power from a telemetry cable and converts the optical power to electrical power.

13. The apparatus of claim 11, wherein the one or more sensors operate in a low power state.

14. The apparatus of claim 11, wherein the one or more sensors comprise one or more of i) an accelerometer; ii) a velocity sensor; iii) a hydrophone; iv) an electromagnetic sensor; v) a velocimeter; vi) a temperature sensor; vii) a heading sensor; viii) a flow sensor; and ix) an inertial sensor.

15. The apparatus of claim 3, wherein the transducer further comprises an interface circuit including a digital electrical-to-digital optical data signal transducer.

16. A method of transmitting a digital optical data signal in a seismic data acquisition system, the method comprising:
 a) modulating an optical carrier to produce the digital optical data signal corresponding to a signal indicative of a sensed environmental condition using a transducer; and
 b) retrieving the digital optical data signals from the optical carrier using an optical interrogator.

17. The method of claim 16 further comprising providing the optical carrier to the transducer using an optical source.

18. The method of claim 16 further comprising providing a digital electrical signal input to the transducer.

19. The method of claim 16, wherein modulating the optical carrier comprises modulating a property of the optical carrier.

20. The method of claim 19, wherein the digital optical data signal includes symbol data indicative of the modulated property.

21. The method of claim 19, wherein the modulated property includes one or more of amplitude and polarization.

22. The method of claim 16, wherein on modulating the optical carrier comprises reflecting the optical carrier using a mirror.

23. The method of claim 22, wherein the mirror comprises a micro-machined mirror.

24. The method of claim 16, wherein using the transducer further comprises using a plurality of transducers.

25. The method of claim 24, wherein the plurality of the transducers includes one or more of a Bragg grating and a liquid crystal device.

26. The method of claim 16, wherein the transducer receives the signal corresponding to a sensed environmental condition from one or more sensors.

27. The method of claim 16 further comprising receiving optical power from a telemetry cable at a power source charging circuit and converting the received optical power to electrical power.

28. The method of claim 26, wherein the one or more sensors operate in a low power state.

29. The method of claim 26, wherein the one or more sensors comprise one or more of i) an accelerometer; ii) a velocity sensor; iii) a hydrophone; iv) an electromagnetic sensor; v) a velocimeter; vi) a temperature sensor; vii) a heading sensor; viii) a flow sensor; and ix) an inertial sensor.

30. The method of claim 18 further comprising providing an interface circuit including a digital electrical-to-digital optical data signal transducer.

31. An apparatus for acquiring digital seismic information, the apparatus comprising:
 a) a sensor for sensing an environmental condition, the sensor providing a first signal indicative of the sensed environmental condition;
 b) a transducer coupled to the sensor for receiving the first signal and converting the first signal to a digital optical data signal indicative of the sensed environmental condition; and
 c) an optical fiber coupled to the transducer.

32. The apparatus of claim 31, wherein the transducer converts the first signal by modulating an optical carrier.

33. The apparatus of claim 32, wherein the transducer includes a controllable reflector operable to modulate an optical carrier.

34. The apparatus of claim 32, wherein the transducer includes a micro-machined reflector operable to modulate an optical carrier.

35. The apparatus of claim 32, wherein the transducer includes an electromechanical actuator acting on the optical fiber to modulate an optical carrier in the optical fiber.

36. The apparatus of claim 31, wherein the transducer includes a controllable light source, the transducer activating and deactivating the controllable light source in response to the first signal to convert the first signal.

37. The apparatus of claim 31, wherein the sensor further includes an analog-to-digital converter, the first signal being a digital electrical signal.

38. A system for acquiring digital seismic information, the system comprising:
 a) a sensor for sensing an environmental condition and providing a first signal indicative of the sensed environmental condition;
 b) a transducer coupled to the sensor for receiving the first signal and converting the first signal to a digital optical data signal indicative of the sensed environmental condition;
 c) an optical fiber coupled to the transducer; and
 d) a recorder recording information based at least in part on the digital optical data signal, the recorded information being indicative of the sensed environmental condition.

39. The system of claim 38 further comprising a light source providing an optical carrier, the transducer operating on the optical carrier to convert the first signal to the digital optical data signal.

40. A method of acquiring digital seismic information relating to an environmental condition, the method comprising:
 a) sensing the environmental condition with a sensor;
 b) generating a first signal indicative of the sensed environmental condition;

c) converting the first signal to a digital optical data signal relating to the digital information; and d) transmitting the digital optical data signal in an optical fiber.

41. The method of claim 40, wherein converting the first signal comprises activating and deactivating a light source.

42. The method of claim 40, wherein converting the first signal comprises acting on an optical carrier to generate the digital optical data signal.

* * * * *